INVENTOR.
MARY M. SMITH

July 14, 1970   M. M. SMITH   3,520,082

LANDSCAPE EDGING AND EROSION CONTROL DEVICE

Filed Jan. 22, 1968   2 Sheets-Sheet 2

INVENTOR.
MARY M. SMITH

BY

Blair Buckles Cesari & St. Onge

ATTORNEY

United States Patent Office 3,520,082
Patented July 14, 1970

3,520,082
LANDSCAPE EDGING AND EROSION CONTROL DEVICE
Mary M. Smith, 39 Burwood Ave., Stamford, Conn. 06902
Filed Jan. 22, 1968, Ser. No. 699,607
Int. Cl. A01g 1/00
U.S. Cl. 47—33     6 Claims

ABSTRACT OF THE DISCLOSURE

The disclosed edging device consists of plural, modular-U-shaped plastic sections of various configurations arranged end to end for establishing a permanent boundary separating grassed or other vegetation areas and contiguous areas of soil etc. Each section consists of a top of sufficient width to inhibit the spread of vegetation thereacross and depending sides whose bottom edges are serrated to facilitate insertion into the ground. Complementary interconnecting means at the ends of each section connect adjacent ones together. Cleats formed on the underside of the top dig into the ground to maintain initial placement.

BACKGROUND OF THE INVENTION

Lawn care and maintenance require considerable time and effort. Powered and hand lawn mowers render cutting the lawn proper a relatively easy task. However, considerable additional time is required in trimming grass or other vegetation along the edges in order to achieve a well manicured appearance. These boundaries, such as along driveways, walks, around trees, flower beds, gardens, golf course sand traps, fountains, etc., typically cannot be trimmed effectively with a lawn mower, and require the additional use of an edging tool, either manual hand clippers or a motorized edging tool.

The problem of trimming the boundaries or edges of a grassed or other area of vegetation is not entirely concerned with cutting the grass down to the height of the lawn proper. Invariably, vegetation spreads into the soil areas and must be periodically weeded out if a neat boundary appearance is to be maintained. In many cases, too, there is a difference of ground levels between the edge of the lawn or vegetation and contiguous areas. This condition makes it virtually impossible to cut the vegetation at its boundary with a mower as the cutting blades dig into the ground. Moreover, the vegetation edge often breaks away and crumbles when subjected to human and mechanical traffic. Erosion also has a deleterious effect on the appearance and condition of a vegetation or other boundary.

Heretofore, lawn edging elements have typically taken the form of elongated thin metal strips which are inserted into the ground to delineate the boundary between the lawn and contiguous areas. Such edging elements have proven to be far from satisfactory. In order to retard vegetation from spreading and to prevent soil erosion, the upper edges of the strips must extend above ground level. As a consequence, these exposed edges interfere with mowing. Moreover, such thin strips provide virtually no lateral rigidity necessary to sustain a well defined edge, and the upper edges are readily bent over if stepped on and present an unsightly appearance, particularly when they become corroded.

SUMMARY OF THE INVENTION

Pursuant to the present invention, there is provided an edging and soil erosion control device consisting of plural, modular length sections of straight, angular and curved configurations interconnected end to end to define and preserve the boundary between a lawn and contiguous areas. The sections are formed of a tough, rigid plastic, highly resistant to weathering, corrosion and aging. The individual sections are generally U-shaped having board, flat tops and integrally formed sides which are inserted into the ground to the extent required to position the top level with the lawn. Preferably, the height of one side is greater than the other to facilitate insertion and alignment of plural sections. The lateral dimension of the top is such as to inhibit the spreading of vegetation growth into contiguous areas. Moreover, the top serves as a supporting track for the wheels of the mowing device which, by virtue of the invention, is rendered capable of trimming the lawn edge without resort to the additional use of an edging device, either manual or mechanized clippers. The spaced parallel sides serve to provide a rather substantial bulkhead which prevents the breakdown and erosion of the desired vegetation or lawn edge.

Adjacent sections have complementary projection-recess provisions for convenient interconnection in forming a complete edging. The recesses may be in the form of bores extending substantially the entire longitudinal length of the sections, and thus the sections can be cut to smaller, desired lengths without destroying the interconnecting provisions. Curved and angular sections adapt the invention to any desired boundary configuration. The edging sections may be economically formed in a plastic mold or by an extrusion process. Moreover, suitable coloration may be readily imparted to the edging sections during manufacture to render them unobtrusive or distinctive, as desired by the user.

The invention accordingly comprises an article of manufacture possessing the features, properties, and the relation of elements which will be exemplified in the article hereinafter described, and the scope of the invention will be indicated in the claims.

DESCRIPTION OF THE DRAWINGS

For a fuller understanding of the nature of the invention, reference should be had to the following detailed description taken in connection with the accompanying drawings in which.

DETAILED DESCRIPTION OF THE PREFERRED EMBODIMENT

Figure 1:
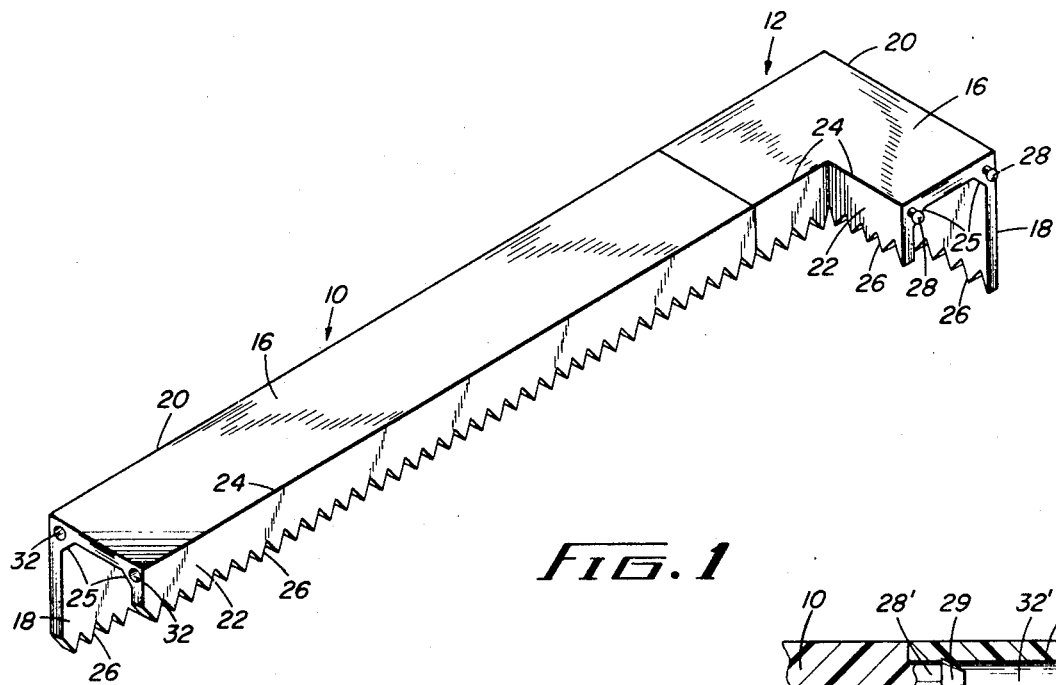
FIG. 1 is a perspective view of an edging device constructed according to a preferred embodiment of my invention wherein an elongated straight section is interconnected to a corner or right angle section.
Figure 4:
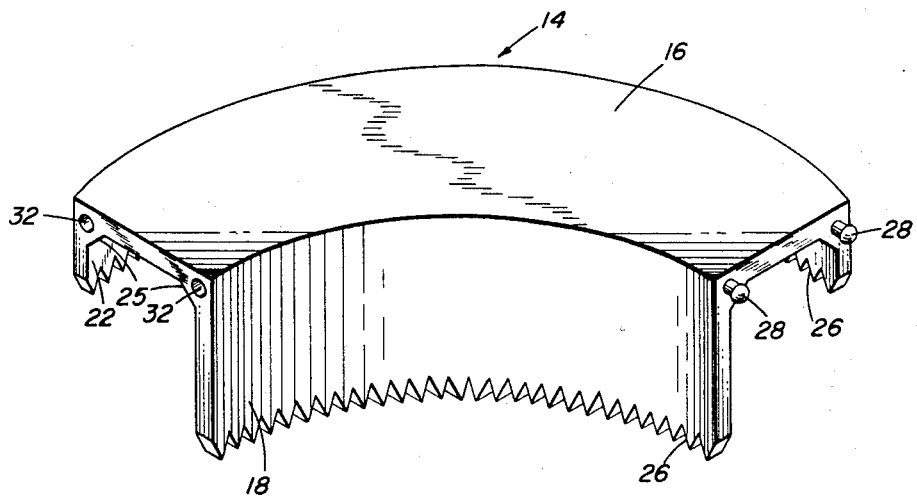
FIG. 4 is a perspective view of a curved edging section constructed according to the invention.

Referring now to the drawings, the edging device embodying the invention consists of plural, modular, edging sections interconnected end to end and inserted into the ground to establish a permanent boundary between a lawn of grass or other vegetation and contiguous areas such as walks, driveways, flower beds, sandtraps, etc. As seen in FIG. 1, a typical straight edging section, generally indicated at 10, is interconnected to the end of one leg of a corner or right angle edging section, generally indicated at 12. It is understood that additional straight, angular and curved edging sections as shown at 14 in FIG. 4 are interconnected end to end in establishing the complete lawn boundary or edging about or along sandtraps, tree wells, walks, driveways, flower beds, etc.

As seen in FIG. 1, each edging section, whether it be straight, curved or angular, is comprised of a relatively broad top 16, a first side 18 integrally joined to the top along one longitudinal edge 20, and a second side 22 integrally joined to the top along its other longitudinal edge 24. Fillets 25 are provided along edges 20 and 22 to add structural rigidity. The two sides 18 and 22 extend downwardly from the top 16 and extend in parallel relation to each other throughout the entire length of the edging section. The side 18 is preferably of a greater height than side 22 for reasons to be explained. The lower free edges of sides 18 and 22 are serrated, as indicated at 26, in order to facilitate insertion of the sides into the ground.

The edging sections of the invention are formed from suitable, rigid polymers or copolymers which are also highly resistant to weathering, corrosion and aging, such as, but not limited to, those of polyethylene or polypropylene. The individual sections may be manufactured inexpensively using a mold or extrusion process.

Figure 2:
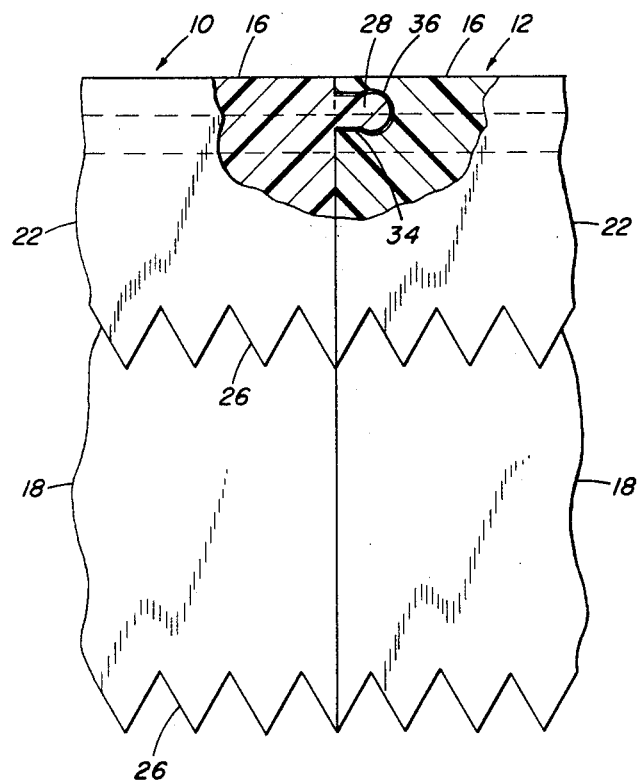
FIG. 2 is an enlarged, fragmentary, side elevational view, partially in section, showing the snap-lock interconnection provision between adjacent edging sections.

As seen in FIG. 2, adjacent edging sections are interconnected by a simple snap-lock arrangement. One end of each section is provided with two integrally formed headed projections 28. The other end of each section is formed having bores 32 with a reduced diameter entrance portion 34 and an enlarged inner portion 36; all dimensioned to accommodate the projections 28 of an adjoining edging section. The bores 32 are located adjacent the longitudinal edges where, due to fillets 25, the thickness dimension is maximum. The projections 28 are forced into the bores 32 with their heads compressing and the entrance portion expanding as the heads are fully inserted. Upon complete insertion of the projections in the bores, a snap-lock interconnection is provided between edging sections.

Figure 5:
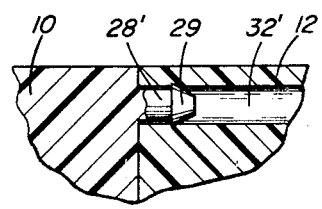
FIG. 5 is an enlarged, fragmentary, side elevational view, partially in section, showing a modified interconnection provision.

In the modification shown in FIG. 5, bores 32' extend substantially the entire length of the section, terminating short of the projections at the opposite end. Projections 28' in the embodiment are formed having a truncated conical-headed portion 29. The periphery of the base of the headed portion 29 serves as an annular barb permitting insertion but inhibiting withdrawal. By virtue of the elongated bores 32', the section can be cut to a shorter length when necessary and still retain the bores 32' for receiving the projections 28'.

In laying the edging device constructed according to the invention, it is preferable to start at one end of the boundary line to be established where one end of the first section is inserted into the ground with foot or hand pressure. The next edging section is then interconnected to the first before the first section is fully inserted into the ground. By interconnecting each succeeding section to its predecessor before the latter is fully inserted into the ground, the sections need not be shifted to make the interconnection while in the ground, although for some soil conditions, this can be done. Alternatively, the sections making up the entire boundary may be interconnected while above the ground and then progressively inserted.

The provision of one side 18 exceeding the height of the other 22 facilitates insertion of the sections into the ground and also renders plural sections more susceptible to aligning manipulation during installation.

Figure 3:
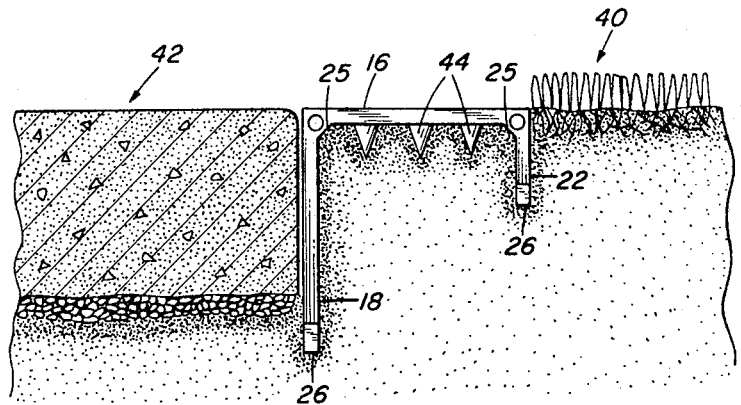
FIG. 3 is a diagrammatic end view showing the edging device of the invention implemented to define the boundary between a grassed area and a paved area.

As seen in FIG. 3, an edging section constructed according to the invention is installed to separate and define a boundary or edge between a vegetation or lawn area 40 and a contiguous area such as a sidewalk 42. The edging section is preferably inserted such that the higher side 18 is adjacent the sidewalk 42. This enables the edging section to serve as a curb or divider in those situations where the level of an adjacent area is less than the level of the lawn 40. Due to the breadth of the edging section, it inherently provides considerable lateral rigidity against any physical breakdown or shifting of the well-defined edge from natural as well as human forces. Moreover, the high side 18 effectively serves as a bulkhead for preventing erosion in such applications.

The accentuated width of the top 16 serves as an effective barrier inhibiting the growth of vegetation thereunder, but also preventing the spread of vegetation growth into or over an adjacent area such as sidewalk 42. Moreover, the edging device of my invention may effectively serve to inhibit the spread of particulate material, such as the stone commonly used on driveways, into contiguous vegetation areas. It will also be observed that the top 16 readily serves as support for the wheels of a lawn mower (not shown), enabling the cutting of the vegetation at the edge of lawn areas without resort to additional trimming by hand or mechanical means. The edging section also serves to shift the outer edge of the growth away from buildings, etc., which would otherwise interfere with the operation of a mower.

It has been determined that to most effectively achieve the purposes and objects of the invention, the top 16 should be about two inches or more in width. One side, for example side 18, should be at least as high as the top 16 is wide. The other side 22 is shown as being approximately one-half of the height of side 18, but may be of equal height. The length of the sections may vary according to the different configurations, but preferably should be on the order of two to three feet long for ease in handling and installation. The thickness of the tops, and sides, may be on the order of 3/16 of an inch or less.

Again referring to FIG. 3, cleats 44 may be added to or integrally formed on the underside of the edging sections. These cleats dig into the ground upon installation and assist in preventing shifting of the edging sections from their initial placement and insure rigidity of placement.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An edging and erosion control device for establishing a boundary between a vegetation area and areas contiguous thereto, said device comprising, in combination:
(A) at least two elongated sections arranged end to end;
(B) each said section being formed of a substantially rigid material having
(1) a broad, flat top disposed substantially flush with the ground level of the vegetation area,
(a) the width of said top being sufficient to inhibit the spread of vegetation thereacross and to accommodate the wheels of a lawn mowing device,
(2) a pair of spaced parallel sides depending from each longitudinal edge of said top,
(a) the lower edges of said sides being serrated to facilitate insertion into the ground to the full extent of the height of at least one of said sides,
(b) one of said sides being of greater height than the other,
(3) fillets disposed between the inner surfaces of said sides and the under surface of said top; and
(C) means provided at the ends of each said section for connecting adjacent ones together, said means including
(1) a pair of headed projections at one end of each said section adjacent said fillets, and
(2) a pair of bores having reduced diameter entrances at the other end of each said section adjacent said fillets,
- (a) the diameter of said bore entrances being slightly less than the maximum diameter of said projections,
- (3) said projections of one of said sections being forcibly inserted into said bores of an adjacent one of said sections to interconnect them end to end.

2. The edging device defined in claim 1 wherein each said section further includes
(1) cleats depending from the underside of said top.

3. The device defined in claim 1 wherein
(1) said top is at least two inches in width.

4. The device defined in claim 3 wherein
(1) at least one of said sides is at least as high as said top is wide.

5. An edging and erosion control device for establishing a boundary between a vegetation area and areas contiguous thereto, said device comprising, in combination:
(A) at least two elongated sections arranged end to end;
(B) each said section being formed of a substantially rigid material having
- (1) a broad, flat top disposed substantially flush to the ground level of the vegetation area,
  - (a) the width of said top being sufficient to inhibit the spread of vegetation thereacross and to accommodate the wheels of a lawn mowing device, and
- (2) a pair of spaced parallel sides depending from each longitudinal edge of said top,
  - (a) the lower edges of said sides being serrated to facilitate insertion into the ground to the full extent of the height of at least one of said sides,
  - (b) one of said sides being of greater height than the other,
- (3) fillets disposed between the inner surfaces of said sides and the under surface of said top; and (C) means provided at the ends of each said section for interconnecting adjacent ones of said sections together, said means including
- (1) a pair of headed projections at one end of each said section adjacent said fillets, and
- (2) a pair of bores at the other end of each said section adjacent said fillets,
  - (a) the diameter of said bores being slightly less than the maximum diameter of said projections,
- (3) said projections of one of said sections being forcibly inserted into said bores of an adjacent one of said sections to interconnect them end to end.

6. The device defined in claim 5 wherein said bores of said interconnecting means extend substantially the entire length of each said section and terminate short of the other end thereof.

References Cited

UNITED STATES PATENTS

| 253,186 | 2/1882 | Cogswell | 47—33 |
| 352,146 | 11/1886 | Oungst | 47—33 |
| 606,151 | 6/1898 | Johnson | 47—33 |
| 1,139,515 | 5/1915 | Haas | 47—33 XR |
| 1,257,768 | 2/1918 | Turner et al. | 47—33 XR |
| 3,065,680 | 11/1962 | Wiedman | 94—31 |
| 3,277,606 | 10/1966 | Cohen | 47—33 |
| 3,281,988 | 11/1966 | Cohen | 47—33 |
| 3,373,668 | 3/1968 | Moore et al. | 94—31 |
| 3,378,949 | 4/1968 | Dorris | 47—33 |

FOREIGN PATENTS 557,844  6/1957  Belgium.

ROBERT E. BAGWELL, Primary Examiner

U.S. Cl. X.R.

287—126, 20.92; 94—31